US009797500B2

(12) United States Patent
Kunishima

(10) Patent No.: US 9,797,500 B2
(45) Date of Patent: Oct. 24, 2017

(54) METHOD FOR MANUFACTURING RACK HOUSING AND RACK HOUSING

(71) Applicant: JTEKT CORPORATION, Osaka-shi, Osaka (JP)

(72) Inventor: Takeshi Kunishima, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 294 days.

(21) Appl. No.: 14/747,600

(22) Filed: Jun. 23, 2015

(65) Prior Publication Data

US 2016/0001500 A1   Jan. 7, 2016

(30) Foreign Application Priority Data

Jul. 3, 2014   (JP) .................................. 2014-137979

(51) Int. Cl.
*B29C 45/14* (2006.01)
*B29C 43/04* (2006.01)
(Continued)

(52) U.S. Cl.
CPC ....... *F16H 57/032* (2013.01); *B29C 45/1418* (2013.01); *B29C 45/14336* (2013.01); *B29C 45/14508* (2013.01); *B29C 45/14786* (2013.01); *B29C 70/462* (2013.01); *B29C 70/465* (2013.01); *B29C 70/86* (2013.01); *B32B 37/0076* (2013.01); *B62D 3/12* (2013.01); *B29D 23/001* (2013.01); *B29K 2101/12* (2013.01); *B29K 2307/04* (2013.01); *B29L 2023/00* (2013.01); *B29L 2031/75* (2013.01); *F16H 2057/02082* (2013.01); *F16H 2057/0325* (2013.01)

(58) Field of Classification Search
CPC ....... B62D 3/12; B29C 70/462; B29C 70/465; B29C 45/1418; B29C 45/14508; B29C 45/14786
See application file for complete search history.

(56) References Cited

U.S. PATENT DOCUMENTS 2,455,215 A      11/1948   Beekwith et al.
4,445,951 A  *   5/1984    Lind ..................... B29B 15/105
                                                      112/401
5,285,864 A  *   2/1994    Martin ..................... B62D 3/12
                                                      180/417

FOREIGN PATENT DOCUMENTS

DE          EP 0343549 A2 *  11/1989   ............... B62D 3/12
DE              10024213 A1 *   3/2002   ............... B62D 5/22
(Continued)

OTHER PUBLICATIONS

Nov. 24, 2015 Extended Search Report issued in European Patent Application No. 15173797.0.

*Primary Examiner* — William Bell
(74) *Attorney, Agent, or Firm* — Oliff PLC

(57) ABSTRACT

Two laminating sheets each formed by laminating a carbon fiber sheet and a film of a thermoplastic resin are set on heating in an area of a mold corresponding to a tubular portion of a rack housing. The mold is clamped, the carbon fiber sheet is impregnated with the thermoplastic resin of the film, each of the two laminating sheets is pressed into a shape with a half tube corresponding to a half circumference of the tubular portion and connection portions at both ends of the half tube in a circumferential direction, and two half tubes are bonded together at the connection portions thereof to form the tubular portion.

7 Claims, 7 Drawing Sheets

(51) Int. Cl.
*B29C 70/46* (2006.01)
*F16H 57/032* (2012.01)
*B62D 3/12* (2006.01)
*B32B 37/00* (2006.01)
*B29C 70/86* (2006.01)
*B29L 31/00* (2006.01)
*F16H 57/02* (2012.01)
*B29L 23/00* (2006.01)
*B29K 307/04* (2006.01)
*B29K 101/12* (2006.01)
*B29D 23/00* (2006.01)

(56) References Cited

FOREIGN PATENT DOCUMENTS

| | | | | |
|---|---|---|---|---|
| DE | 102004017888 A1 | * | 11/2005 | ............. B21C 37/06 |
| DE | WO 2012100887 A1 | * | 8/2012 | ............... B62D 3/12 |
| DE | 102011100222 A1 | | 11/2012 | |
| DE | 102013020871 A1 | * | 6/2015 | ............. B29C 33/76 |
| EP | 2899009 A1 | | 7/2015 | |
| FR | EP 2436576 A1 | * | 4/2012 | ............... B62D 3/12 |
| GB | 2154299 A | * | 9/1985 | ............... B62D 3/12 |
| GB | 2465159 A | * | 5/2010 | ............. B29C 43/18 |
| JP | H07-140262 A | | 6/1995 | |
| JP | 5136876 B2 | | 2/2013 | |
| JP | 2013-208927 A | | 10/2013 | |
| JP | 2013208927 A | * | 10/2013 | |

* cited by examiner

37

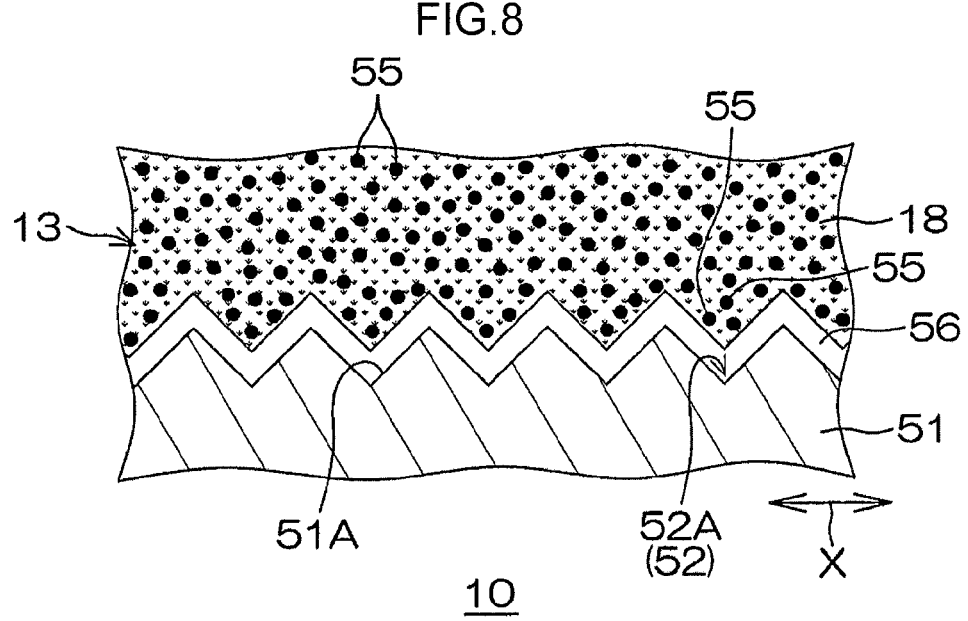

METHOD FOR MANUFACTURING RACK HOUSING AND RACK HOUSING

INCORPORATION BY REFERENCE

The disclosure of Japanese Patent Application No. 2014-137979 filed on Jul. 3, 2014 including the specification, drawings and abstract, is incorporated herein by reference in its entirety.

BACKGROUND OF THE INVENTION

1. Field of the Invention

The invention relates to a method for manufacturing a rack housing and the rack housing manufactured by the method.

2. Description of Related Art

A rack-and-pinion steering system in an automobile and the like uses a rack housing to fix a rack shaft to a vehicle body while supporting the rack shaft so as to allow free linear reciprocating motions of the rack shaft. The rack housing is formed to be elongate in an axial direction of the rack shaft and receives a steering reaction force transmitted from wheels at the time of steering. Thus, the rack housing as a whole is generally formed of an aluminum die cast material or the like with excellent strength and rigidity.

However, recent demands for energy saving has led to a demand for a reduction in the weights of automotive components. Thus, also for the rack housing, the weight of which occupies a large portion of the total weight of the steering system, effort is being made to achieve a weight reduction while ensuring the needed strength and rigidity. For the weight reduction, a cylindrical portion of the rack housing through which the rack shaft is inserted may be formed by molding a prepreg including textile fibers impregnated with a thermosetting resin into a tubular shape as described in Japanese Patent Application Publication No. 2013-208927 (JP 2013-208927 A).

Japanese Patent No. 5136876 (JP 5136876 B) describes a prepreg including two layers of a reinforced fiber base material secured together with a binding agent of a thermoplastic resin placed between the layers. Japanese Patent Application Publication No. H7-140262 (JP H7-140262 A) describes, as a prepreg, a plastic case formed of a carbon fiber fabric impregnated with a resin.

For the prepreg of the thermosetting resin as described in JP 2013-208927 A, a long time is needed to form the cylindrical portion of the rack housing. That is, the formation takes approximately five hours or more from the start of heating until the cylindrical portion is completed by completely curing the thermosetting resin, including a fluidization time needed to heat and soften a sheet-like prepreg in order to mold the prepreg into a tubular shape and a temperature increase time needed to raise the temperature of the prepreg to the curing temperature of the thermosetting resin after the molding of the prepreg into the tubular shape.

Given that a cycle time desired for manufacture of automotive components is approximately one minute, the above-described time is very long and much energy is consumed by the continuous heating during the time, leading to concern for increased costs. The use of a prepreg of a thermoplastic resin as described in JP 5136876 B enables a reduction in the cycle time for the rack housing. However, the prepreg is a thick sheet that is difficult to deflect. Thus, when the prepreg is pressed at once to form the rack housing, defects such as delamination and wrinkling may occur in the prepreg.

SUMMARY OF THE INVENTION

An object of the present invention is to provide a manufacturing method allowing a rack housing with a reduced weight to be manufactured in a short time while suppressing possible defects during molding and the rack housing manufactured by the manufacturing method.

A method for manufacturing a rack housing according to an aspect of the present invention includes: setting two laminating sheets on heating in an area of a mold corresponding to a three-dimensional shape of the rack housing with a tubular portion that covers a rack shaft, the area corresponding to the tubular portion, the laminating sheets each being formed by laminating a carbon fiber sheet and a film of a thermoplastic resin; and clamping the mold, impregnating the carbon fiber sheet with the thermoplastic resin of the film, pressing each of the two laminating sheets into a shape with a half tube corresponding to a half circumference of the tubular portion and connection portions at both ends of the half tube in a circumferential direction, and bonding two half tubes together at the connection portions thereof to form the tubular portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 8 is a diagram illustrating application of a second modification to FIG. 7.

DETAILED DESCRIPTION OF EMBODIMENTS

Figure 1:
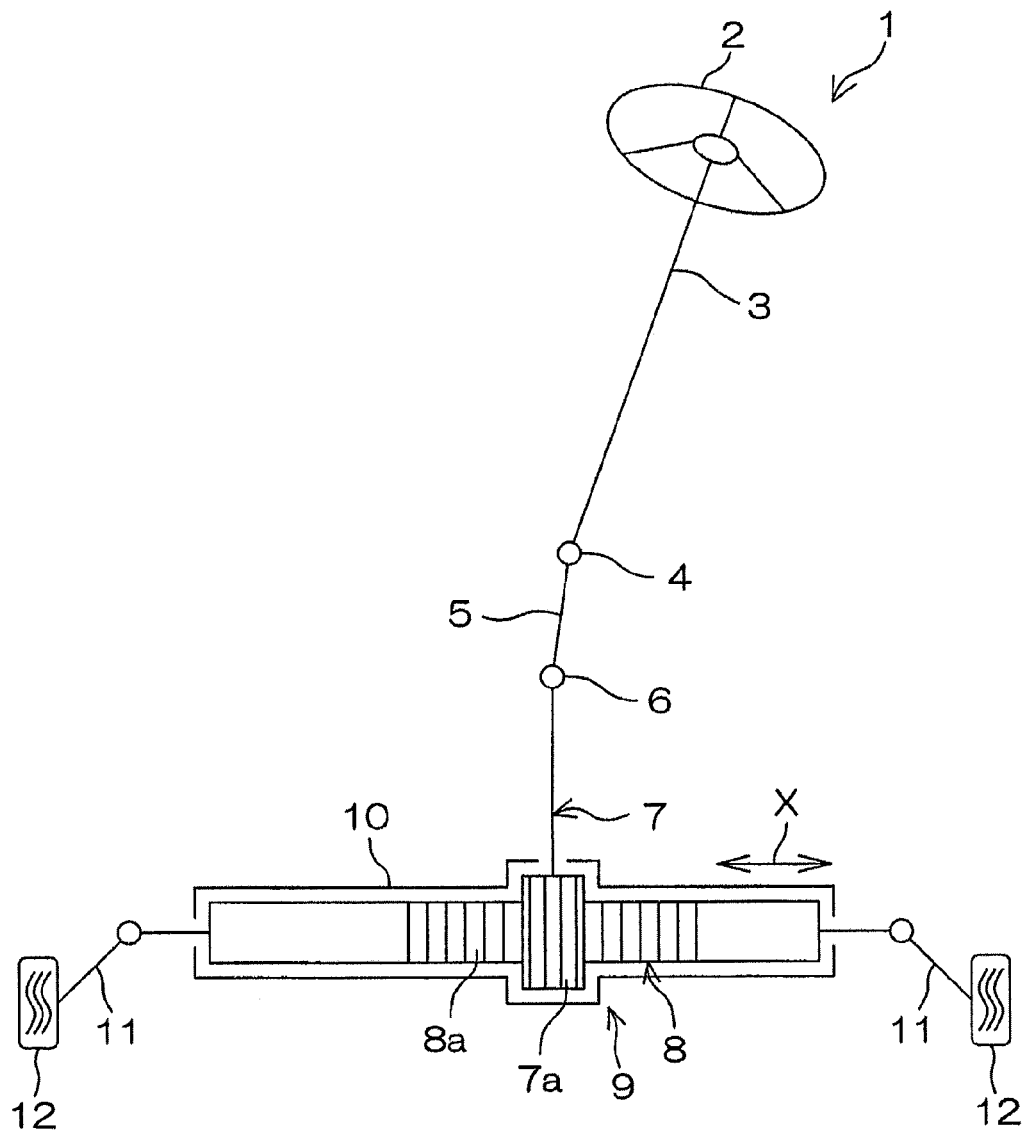
FIG. 1 is a schematic diagram of an example of a steering system into which a rack housing in the present invention can be incorporated.

An embodiment of the present invention will be described below in detail with reference to the drawings. FIG. 1 is a schematic diagram of an example of a steering system into which a rack housing in the present invention can be incorporated.

As seen in FIG. 1, a steering system 1 includes a steering shaft 3 and an intermediate shaft 5. The steering shaft 3 is coupled to a steering wheel 2 so as to be rotatable integrally with the steering wheel 2. The intermediate shaft 5 is coupled to the steering shaft 3 via a universal joint 4. The steering system 1 further includes a pinion shaft 7 and a rack shaft 8. The pinion shaft 7 is coupled to the intermediate shaft 5 via a universal joint 6. The rack shaft 8 has rack teeth 8a that mesh with pinion teeth 7a provided on the pinion shaft 7 and extends in a vehicle lateral direction.

The pinion shaft 7 and the rack shaft 8 provide a steering mechanism 9 that is a rack-and-pinion mechanism. The rack shaft 8 is supported by a rack housing 10 via a plurality of bearings not depicted in the drawings, so as to make free linear reciprocating motions along an axial direction X of the rack housing in the rack housing 10 fixed to a vehicle body. Each end of the rack shaft 8 protrudes toward its respective side of the rack housing 10. Tie rods 11 are coupled to both ends of the rack housing 10.

Figure 2:
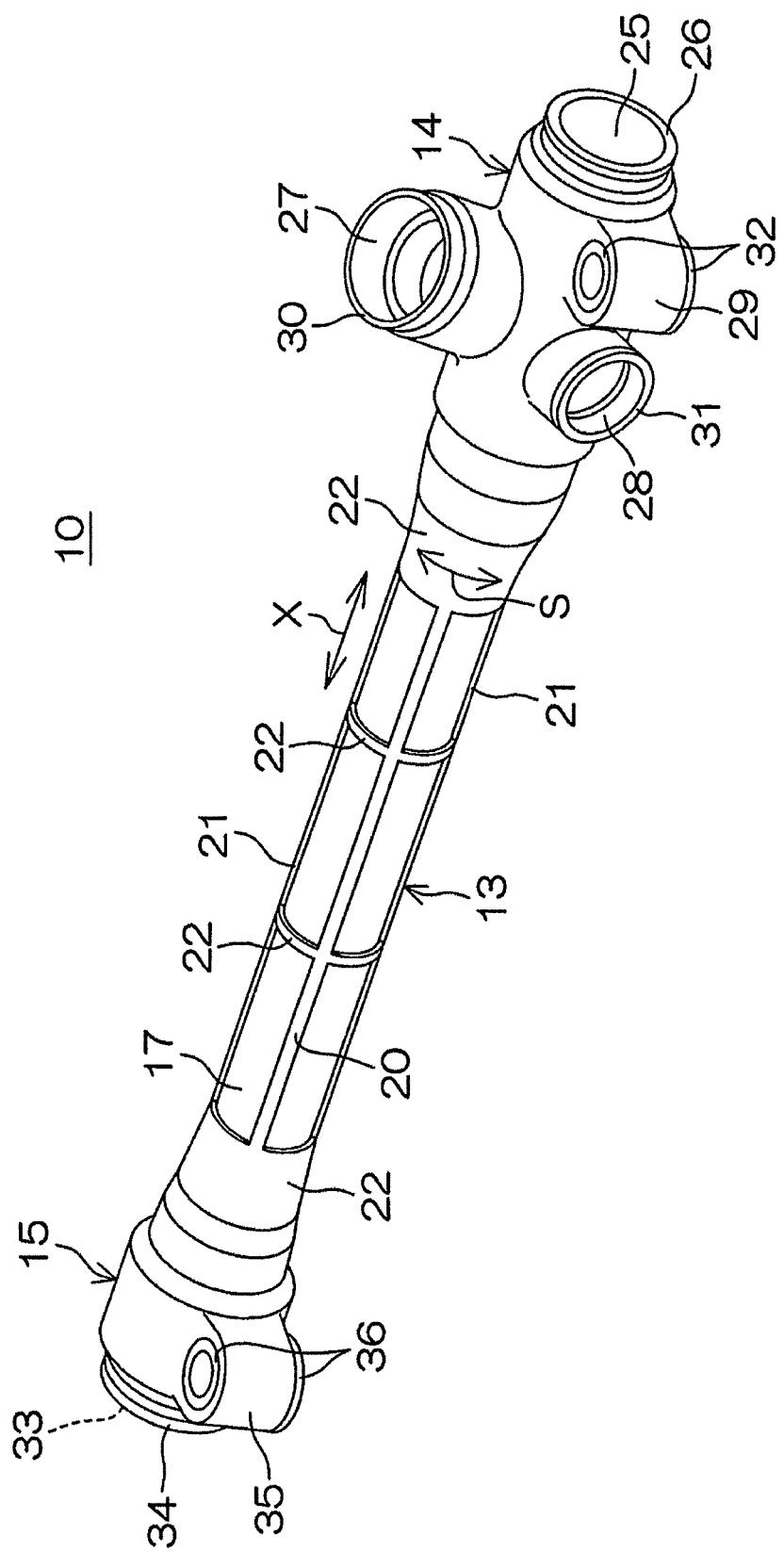
FIG. 2 is a perspective view of an example of an embodiment of the rack housing in the present invention.
Figure 3A:
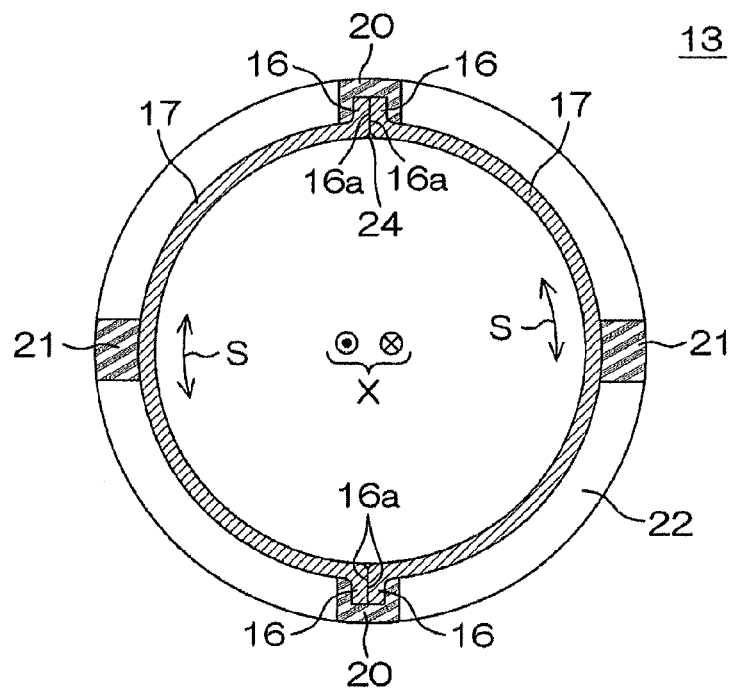
FIG. 3A is a cross-sectional view of a tubular portion of the rack housing in FIG. 2 as cut across a cutting plane that is orthogonal to an axial direction of the tubular portion.
Figure 3B:
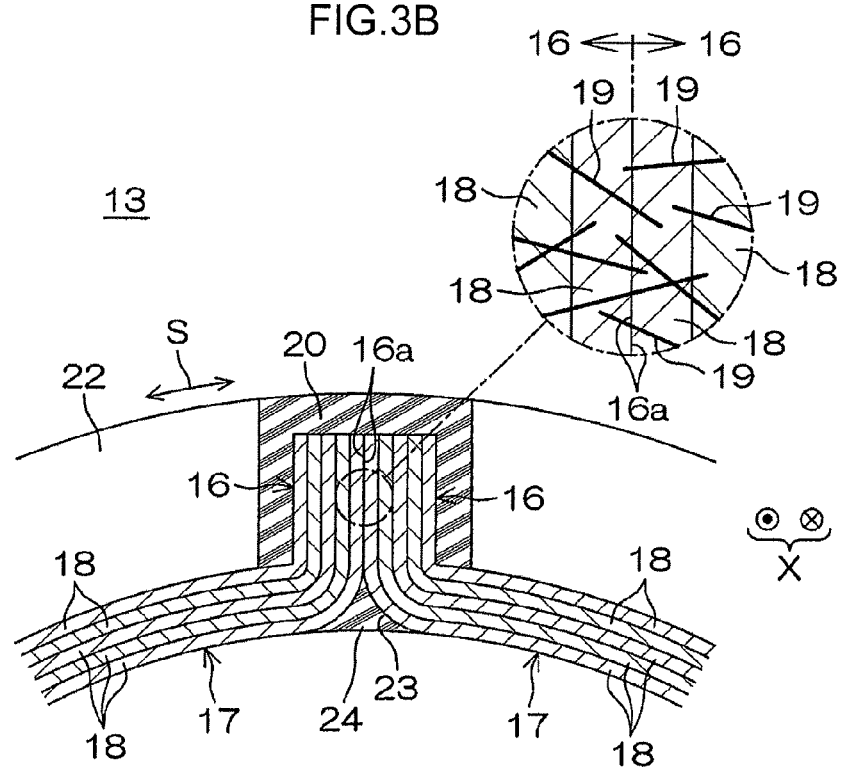
FIG. 3B is an enlarged cross-sectional view of a part of FIG. 3A.

Each of the tie rods 11 is coupled to a corresponding turning wheel 12 via a knuckle arm not depicted in the drawings. When a driver operates the steering wheel 2 to rotate the steering shaft 3, the rotation is converted by the pinion teeth 7a and the rack teeth 8a into a linear motion of the rack shaft 8 along the vehicle lateral direction (axial direction X) to turn the turning wheels 12. FIG. 2 is a perspective view depicting an example of an embodiment of the rack housing 10 in the present invention. FIG. 3A is a cross-sectional view of a tubular portion of the rack housing 10 in FIG. 2 as cut along a cutting plane orthogonal to the axial direction. FIG. 3B is an enlarged cross-sectional view of a part of FIG. 3A.

As seen in FIG. 2, the rack housing 10 includes a tubular portion 13 and coupling portions 14 and 15. The tubular portion 13 has a cylindrical three-dimensional shape extending in the axial direction X of the rack shaft 8 to cover the rack shaft 8. The coupling portions 14 and 15 are coupled to the two ends of the tubular portion 13 in the axial direction X. The axial direction of the tubular portion 13 is the same as the axial direction X. As seen in FIG. 3A, the tubular portion 13 is divided into two half tubes 17 with a cross-sectional shape corresponding to a half circumference of the tubular portion 13. Each of the half tubes 17 is integrally provided with flat plate-shaped connection portions 16 bent outward from both ends thereof in a circumferential direction S and extending along the entire length of the tubular portion 13 in the axial direction X. Side surfaces 16a of the connection portions 16 of the two half tubes 17 are coupled together so that the two half tubes 17 form one circular cross-sectional shape. The tubular portion 13 is formed as described above.

As seen in FIG. 3B, the half tube 17 as a whole is formed by laminating a plurality of layers of a fiber reinforced composite material 18 configured by impregnating a carbon fiber sheet with a thermoplastic resin. In the plurality of layers of the fiber reinforced composite material 18, filament-shaped fillers 19 randomly penetrating at least two layers of the fiber reinforced composite material 18 reinforce the coupling between the layers. Thus, each half tube 17 is prevented from being subjected to delamination or a reduction in strength, shock resistance, heat shock resistance, or the like caused by delamination.

The two layers of the fiber reinforced composite material 18, which is laminated with the respective side surfaces 16a of the connection portions 16 of the two half tubes 17 used as seams, are also integrated together via the thermoplastic resin. Moreover, the fillers 19 randomly penetrating the fiber reinforced composite material 18 including the two layers reinforce the coupling between the side surfaces 16a of the connection portions 16. Thus, the half tubes 17 are prevented from being delaminated (separated) from each other.

The connection portions 16 coupled together and protruding radially outward from the tubular portion 13 are covered with a rib 20. A total of two ribs 20 are present corresponding to the points where the connection portions 16 are coupled together (see FIG. 3A). The ribs 20 are integrated with the tubular portion 13 along the entire length of the tubular portion 13 in the axial direction X. The ribs 20 further reinforce the coupling between the connection portions 16 at both ends of each half tube 17 in the circumferential direction S. Thus, the connection portions 16 are more reliably prevented from being delaminated from each other.

As seen in FIG. 3A, ribs 21 are each provided on an outer periphery of the tubular portion 13 at a position midway between the two ribs 20 in the circumferential direction S, so as to lie parallel to the ribs 20. The ribs 21 protrude radially outward from the tubular portion 13 and extend along the entire length of the tubular portion 13 in the axial direction X. Furthermore, a ring-like rib 22 is provided on an outer peripheral surface of the tubular portion 13 at a plurality of points in the axial direction (see FIG. 2). The ring-like ribs 22 extend along the entire circumference of the tubular portion 13 orthogonally to the ribs 20 and 21.

As seen in FIG. 3B, an inner peripheral surface of the tubular portion 13 is coated with a coating 24 that is buried in a recess portion 23 formed between base ends of the connection portions 16 when the connection portions 16 are bent radially outward. Thus, the inner peripheral surface of the tubular portion 13 is smoothed to allow improvement of the property of sliding between the inner peripheral surface of the tubular portion 13 and the rack shaft 8. The ribs 20 to 22 and the coating 24 are integrated with the tubular portion 13 with a thermoplastic resin including the fillers 19, along with the coupling portions 14 and 15 described below.

As seen in FIG. 2, the coupling portion 14 is wholly formed of the thermoplastic resin including the fillers 19 and shaped generally like a tube that is contiguous with one end of the tubular portion 13 (in FIG. 2, a right end). On a side (in FIG. 2, a right side) of the coupling portion 14 away from the tubular portion 13, an opening 25 is formed, through which one end (in FIG. 2, a right end) of the rack shaft 8 protrudes outward. A metallic collar 26 is integrated with a peripheral portion of the opening 25 in the coupling portion 14 to reinforce the peripheral portion. The rack shaft 8, which is a separate component for the rack housing 10, is inserted through the collar 26, and a boot (not depicted in the drawings) is attached to the collar 26 to close the opening 25 while permitting linear motions of the rack shaft 8.

An opening 27 and an opening 28 are formed in a side surface of the coupling portion 14. The pinion shaft 7 is inserted through the opening 27. A support yoke (not depicted in the drawings) that supports the rack shaft 8 is inserted into the opening 28. An attachment portion 29 protrudes from the side surface of the coupling portion 14 to allow the rack housing 10 to be fixed to the vehicle body. A metallic collar 30 is integrated with a peripheral portion of the opening 27 in the coupling portion 14 to reinforce the peripheral portion. The pinion shaft 7, which is a separate component for the rack housing 10, is inserted through the collar 30. A cover for the pinion shaft (not depicted in the drawings) is attached to the collar 30.

A metallic collar 31 is integrated with a peripheral portion of the opening 28 in the coupling portion 14 to reinforce the peripheral portion. The support yoke (not depicted in the drawings), which is a separate component for the rack housing 10, is inserted through the collar 31. A sealing member (not depicted in the drawings) that closes the opening 28 into which the support yoke has been inserted is attached to the collar 31. The attachment portion 29 is formed of the thermoplastic resin including the fillers 19 and integrated with the coupling portion 14. The attachment portion 29 is integrated with a metallic collar 32 with a through-hole through which a bolt or the like is inserted to allow the rack housing 10 to be attached to the vehicle body.

The coupling portion 15 is wholly formed of the thermoplastic resin including the fillers 19 and shaped generally like a tube that is contiguous with the other end of the tubular portion 13 (in FIG. 2, a left end). On a side (in FIG. 2, a left side) of the coupling portion 15 away from the tubular portion 13, an opening 33 is formed, through which the other end (in FIG. 2, a left end) of the rack shaft 8 protrudes outward. A metallic collar 34 is integrated with a peripheral portion of the opening 33 in the coupling portion 15 to reinforce the peripheral portion. A boot (not depicted in the drawings) is attached to the collar 34 to close the opening 33 while permitting linear motions of the rack shaft 8.

Figure 4:
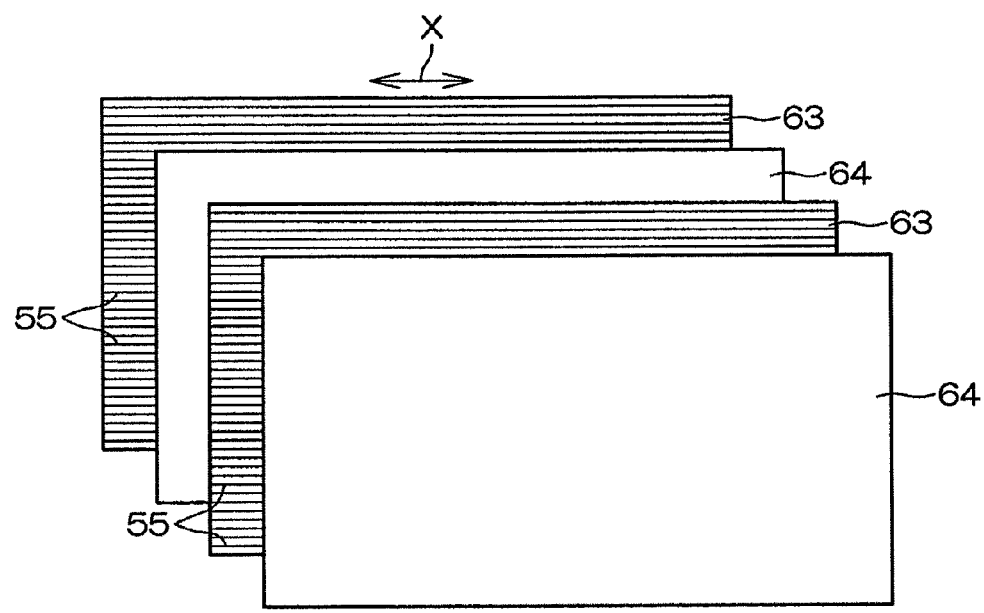
FIG. 4 is a schematic diagram depicting a configuration of a laminating sheet.
Figure 5A:
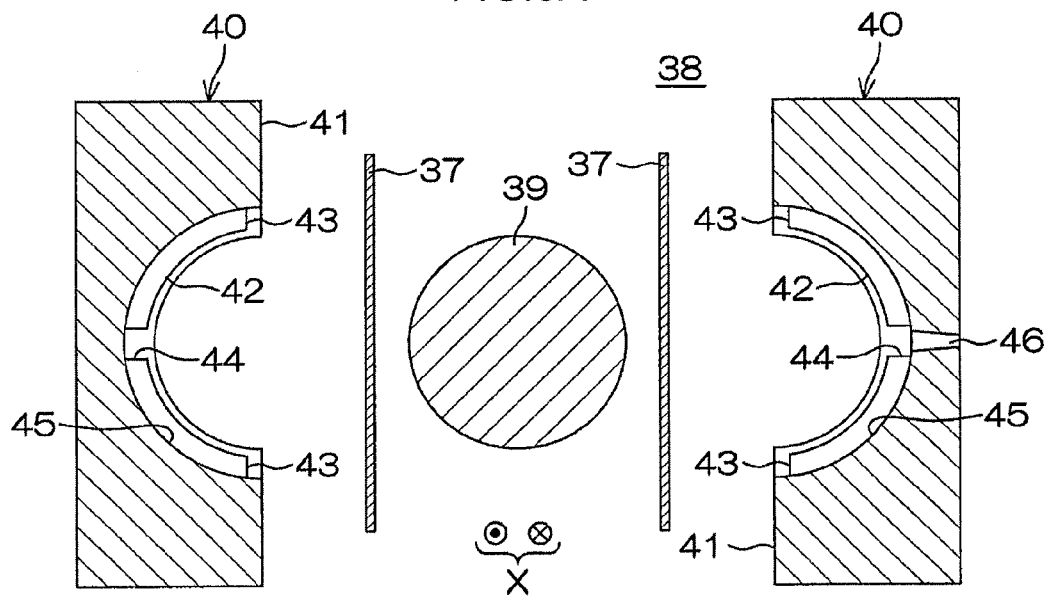
FIG. 5A and FIG. 5B are cross-sectional views illustrating a step of manufacturing the rack housing in FIG. 2 by a manufacturing method in the present invention.
Figure 5B:
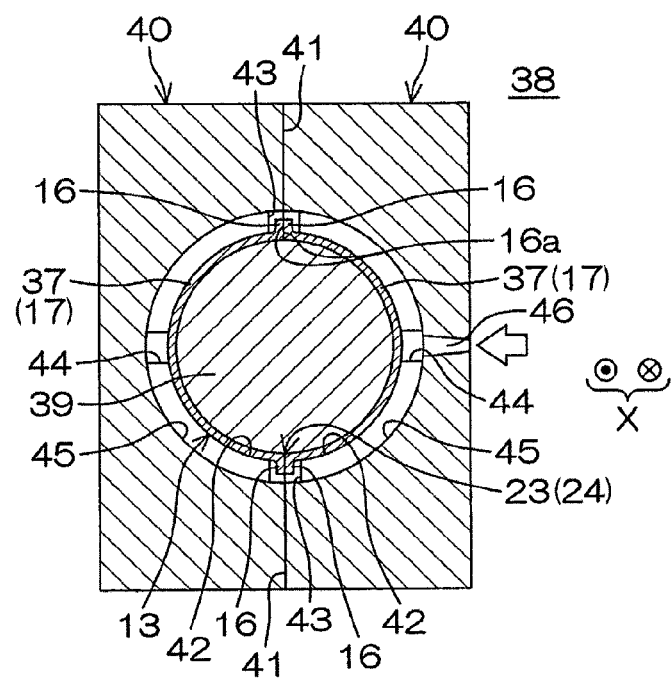

An attachment portion 35 protrudes from a side surface of the coupling portion 15 to allow the rack housing 10 to be fixed to the vehicle body. The attachment portion 35 is formed of the thermoplastic resin including the fillers 19 and integrated with the coupling portion 15. The attachment portion 35 is integrated with a metallic collar 36 with a through-hole through which a bolt or the like is inserted to allow the rack housing 10 to be attached to the vehicle body. FIG. 4 is a schematic diagram depicting a configuration of a laminating sheet serving as a material for the tubular portion 13. FIG. 5A and FIG. 5B are cross-sectional views illustrating a step of manufacturing the rack housing 10 by a manufacturing method according to the present invention.

As seen in FIG. 4, the above-described carbon fiber sheets (hereinafter referred to as carbon fiber sheets 63) and films 54 of the thermoplastic resin are prepared; the numbers of the carbon fiber sheets 63 and the films 64 are each that needed to secure the thickness of the tubular portion 13 after molding. The carbon fiber sheets 63 that have not been laminated are not impregnated with a resin and are dry. Examples of the carbon fiber sheet 63 include a woven cloth, a nonwoven cloth, and a strand which are formed of carbon fibers 55, in view of an increase in the strength and a reduction in the weight of the tubular portion 13. The carbon fibers 55 may be any carbon fibers typified by "TORAYCA" (registered trademark) T300 and "TORAYCA" (registered trademark) T700. A part of the carbon fiber 55 may be replaced with glass fiber or aramid fiber. The orientation of the carbon fibers 55 in the carbon fiber sheet 63 is set so as to contribute to improving the rigidity of the tubular portion 13. The carbon fibers 55 are aligned mostly with the axial direction X.

Examples of the thermoplastic resin forming the film 64 include nylon 6, nylon 66, polyamide 66, polyphenylene sulfide (PPS), thermoplastic polyurethane (TPU), and polyether ether ketone (PEEK). The type of the thermoplastic resin may be changed as needed. However, the rack housing 10 is used inside an engine room in the vehicle and thus may instantaneously reach close to 150° C. Accordingly, as the thermoplastic resin, the polyamide 66, polyphenylene sulfide (PPS) resin, or polyether ether ketone resin is desirably used which offers heat resistance sufficient to allow the resin to be used in such a situation and which can be easily formed into a film.

The carbon fiber sheets 63 and the films 64 are laminated together to form one laminating sheet 37. A preferable lamination pattern for the carbon fiber sheets 63 and the films 64 is such that the carbon fiber sheets 63 and the films 64 are alternately laminated. Besides, a lamination pattern is possible, in which the films 64 are laminated after the carbon fiber sheets 63 are consecutively laminated.

In the laminating sheet 37, the carbon fiber sheets 63 and the films 64 may be temporarily tacked together by partial bonding with a binding agent or sewing with yarns of polyester or the like as needed. In the complete laminating sheet 37, the carbon fiber sheets 63 are dry as described above. In the present embodiment, the laminating sheet 37 is also referred to as a "semi-preg sheet (a sheet not impregnated with the carbon fibers 55). A sheet including fibers pre-impregnated with a resin is referred to as a prepreg (sheet).

Then, as seen in FIG. 5A, a mold 38 for injection molding is prepared in order to allow a step of pressing and a step of injection molding to be executed. In the step of pressing, two laminating sheets 37 are each pressed into the shape of the half tube 17 and are bonded together to form a tubular portion 13. In the step of injection molding, the thermoplastic resin including the fillers 19 is injection-molded to form the ribs 20 to 22 and the coupling portions 14 and 15. The mold 38 includes a columnar inner mold 39 and two outer molds 40. The inner mold 39 has an outer diameter corresponding to the inner diameter of the tubular portion 13 and extends in the axial direction X. Each of the two outer molds 40 is provided with a flat mating surface 41 that is brought into abutting contact with the other outer mold 40 when the mold 38 is clamped. When the mold 38 is clamped, the mating surfaces 41 of the two outer molds 40 come into surface contact with each other. In the mating surface 41 of each of the outer molds 40, a recess portion 42 is formed to recess away from the other outer mold 40. The recess portion 42 is formed to fit a half circumference of the tubular portion 13. The recess portion 42 has an inner diameter corresponding to the outer diameter of the tubular portion 13 and a length corresponding to the overall length of the tubular portion 13 in the axial direction X.

Each outer mold 40 has grooves 43 to 45 corresponding to the ribs 20 to 22 such that the grooves 43 to 45 communicate with the recess portion 42. Thus, in an opening of the recess portion 42 at the mating surface 41, the groove 43 is formed, which has a depth equal to half the thickness of the rib 20 and which extends over the entire length of the recess portion 42 in the axial direction X. In the deepest portion of the recess portion 42 of each outer mold 40, the groove 44 is formed, which corresponds to the rib 21 and which extends over the entire length of the recess portion 42 in the axial direction X. Moreover, the circular arc-shaped groove 45 corresponding to each rib 22 is formed at a plurality of points in the recess portion 42 in the axial direction X.

In the right outer mold 40 in FIG. 5A, a gate 46 is formed which is brought into contact with a tip of a nozzle of an injection molding machine not depicted in the drawings and through which the thermoplastic resin is injected into the mold 38. Although not depicted in FIG. 5A, spaces referred to as coupling portion forming areas corresponding to the three-dimensional shapes of the above-described coupling portions 14 and 15 (see FIG. 2) are contiguously formed on both sides (the sides closer to and farther from the viewer in the sheet of FIG. 5A), in the axial direction X, of an area of the mold 38 corresponding to the tubular portion 13. At predetermined points in the coupling portion forming area, holding portions are formed in which corresponding ones of the collars 26, 30, 31, 32, and 34 are set.

In the mold 38 as described above, a space between the inner mold 39 and the two outer molds 40 with the mating surfaces 41 brought into surface contact with each other by clamping corresponds to the three-dimensional shape of the rack housing 10. To manufacture the rack housing 10 using the mold 38 as described above, first, two laminating sheets 37 described above are prepared that are identical in number to the half tubes 17. Then, each of the laminating sheets 37 is heated (preheated) approximately to the melting point of the thermoplastic resin (mostly the melting point or higher) using, for example, an oven or an infrared heater so as to be softened or melted. Then, the heated two laminating sheets 37 are set in the area in the mold 38 corresponding to the tubular portion 13 (in the space between the inner mold 39 and the two outer molds 40) so as to sandwich the inner mold 39 between the laminating sheets 37 as depicted in FIG. 5A. At this time, in the mold 38, the collars 26, 30, 31, 32, 34, and 36 are set in the holding portions (not depicted in the drawings) in the coupling portion forming areas corresponding to the coupling portions 14 and 15, as described above.

Then, as seen in FIG. 5B, the mold 38 is clamped so as to bring the mating surfaces 41 of the two outer molds 40 into surface contact with each other with the inner mold 39 sandwiched between the two outer molds 40. At this time, the mold 38 may be clamped by moving one of the two outer molds 40 closer to the other outer mold 40 that is fixed. In each of the two heated laminating sheets 37, pressure resulting from clamping of the mold 38 causes the carbon fibers 55 in each of the carbon fiber sheets 63 (see FIG. 4) to be impregnated with the thermoplastic resin of the softened or melted film 64 as what is called a matrix resin. Each carbon fiber sheet 63 changes into the above-described fiber reinforced composite material 18, and the adjacent fiber reinforced composite materials 18 are integrated together. At the same time, each of the two laminating sheets 37 is pressed on heating so as to have a general U shape with the half tube 17 and the connection portions 16. The two half tubes 17 are bonded and integrated together at the side surfaces 16a of the connection portions 16 by surface welding. Thus, the tubular portion 13 is formed.

To facilitate impregnation of the carbon fibers 55 in the carbon fiber sheet 63 with the thermoplastic resin, an opening treatment (a treatment for widening the gaps between the carbon fibers 55) based on an air flow method or the like is preferably executed in advance on the carbon fiber sheet 63. The films 64 in each laminating sheet 37 may be compounded with an additive that allows the toughness of the films 64 themselves to be improved and the adhesion between the thermoplastic resin and the carbon fibers 55 or a plasticizer or a thinner that allows the processability of pressing to be improved.

Subsequent to the pressing, the thermoplastic resin including the fillers 19 is injected into the mold 38 through the gate 46 as depicted by a white arrow in FIG. 5B. Then, the plurality of layers of the fiber reinforced composite material 18 in the tubular portion 13 are more firmly bonded together by, in addition to the thermoplastic resin contained in each layer, the injected thermoplastic resin infiltrating between and through the fiber reinforced composite materials 18 and the fillers 19 (in the thermoplastic resin) penetrating the at least two laminated layers of the fiber reinforced composite material 18.

The connection portions 16 of the half tubes 17 are more firmly bonded together by the injected thermoplastic resin and the fillers 19 penetrating the two layers of the fiber reinforced composite material 18 providing the connection portions 16. The thermoplastic resin injected into the mold 38 is injected into the tubular portion 13 formed by pressing. Thus, the thermoplastic resin is formed into the ribs 20 to 22 integrated with the outer periphery of the tubular portion 13, and the inner peripheral surface of the tubular portion 13 is coated with the coating 24. In this step, at one end of the tubular portion 13, the thermoplastic resin is formed into the coupling portion 14 with which the collars 26, 30, 31, and 32 are integrated. At the other end of the tubular portion 13, the thermoplastic resin is formed into the coupling portion 15 with which the collars 34 and 36 are integrated. Then, each of the coupling portions 14 and 15, the tubular portion 13, and the ribs 20 to 22 are integrated together via the thermoplastic resin.

Then, the thermoplastic resin is cooled and solidified, and thereafter, the mold 38 is opened to separate the outer molds 40 from each other. The inner mold 39 is pulled out from the tubular portion 13 in the axial direction X to obtain the rack housing 10 depicted in FIG. 2. In the above-described manufacturing method, the tubular portion 13 covering the rack shaft 8 in the rack housing 10 is formed of carbon fiber reinforced thermoplastics (CFRTP) using the thermoplastic resin. This enables a reduction in the weight of the rack housing 10 compared to the case where the tubular portion 13 is formed of metal such as aluminum die cast materials.

At a material stage, the laminating sheet 37 forming the tubular portion 13 is divided into the carbon fiber sheets 63 and the films 64 of the thermoplastic resin. The carbon fiber sheets 63 and the films 64 of the thermoplastic resin are each thin and easy to deflect, compared to a prepreg in which the carbon fibers 55 are pre-impregnated with the resin (see FIG. 4). When the rack housing 10 is manufactured, the laminating sheet 37 is formed by laminating the carbon fiber sheets 63 and the films of the thermoplastic resin. The tubular portion 13 is formed by bonding the connection portions 16 of the two half tubes 17. Thus, during manufacture of the rack housing 10, even when the two laminating sheets 37 are set in the mold 38 on heating and pressed by clamping the mold 38, the tubular portion 13 is prevented from being subjected to delamination or wrinkling, which is likely to occur when the prepreg is pressed.

Furthermore, unlike the thermosetting resins, the thermoplastic resin eliminates the need for time for softening and fluidization to some degree before curing and a curing time until complete curing. The formation of the tubular portion 13 using the thermoplastic resin takes a short molding time of approximately one minute (short cycle time) compared to the formation of the tubular portion 13 using the thermosetting resin. Hence, the time needed for working can be shortened, resulting in a reduction in the manufacturing costs of the rack housing 10. The tubular portion 13 is formed by pressing the two laminating sheets 37. The coupling portions 14 and 15 are formed by injection-molding the thermoplastic resin including the fillers 19. The two steps, that is, the step of forming the tubular portion 13 and the step of forming the coupling portions 14 and 15 and integrating the components together, can be consecutively executed using the same mold 38.

Thus, the rack housing 10 with the weight thereof reduced can be manufactured in a short time with possible defects during molding suppressed. The ribs 20 are formed of the thermoplastic resin injected so as to cover the bonded connection portions 16 of the two half tubes 17 forming the tubular portion 13. The ribs 20 enable the connection between the connection portions 16 to be reinforced, allowing the strength of the tubular portion 13 to be improved.

Furthermore, the injection molding of the thermoplastic resin allows the formation of complicatedly shaped components such as the coupling portions 14 and 15 and the integration of the coupling portions 14 and 15 and the tubular portion 13 to be achieved at a time. Thus, the rack housing 10 can be manufactured in a shorter time. The coupling portions 14 and 15 and the collars 26, 30, 31, 32, 34, and 36 (corresponding ones of these collars) are integrated together. The fillers 19 disperse in the thermoplastic resin injected into the tubular portion 13 to reinforce the structures of the thermoplastic resin (the tubular portion 13, the coupling portions 14 and 15, and the ribs 20 to 22). The fillers 19 also penetrate and firmly couple the bonded connection portions 16 of the two half tubes 17. This allows the fastening strength between the half tubes 17 to be improved, enabling an increase in the strength and rigidity of the tubular portion 13 as a whole including the coupling portions 14 and 15.

Figure 6:
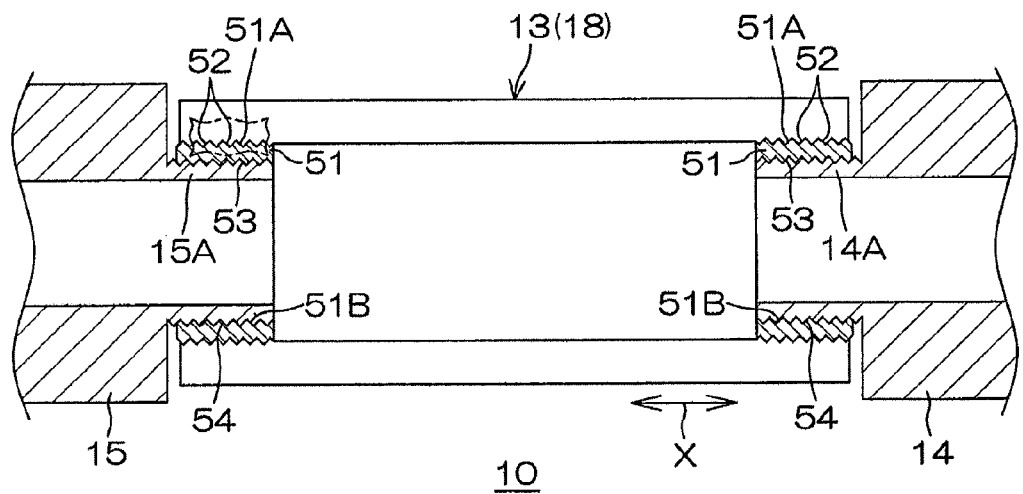
FIG. 6 is a sectional view of a rack housing according to a first modification of the present invention as cut along a cutting plane extending along the axial direction.

The fillers 19 serve to penetrate the at least two laminated layers of the fiber reinforced composite material 18 to reinforce the coupling between the layers and to increase the strength and rigidity of the tubular portion 13, the ribs 20 to 22, and the coupling portions 14 and 15. Thus, various fillers such as fibrous or sheet-like fillers are available as the fillers 19. However, filament-like carbon fibers are particularly preferable. The carbon fibers themselves have a high strength, and when formed into filaments, can penetrate two or more laminated layers of the fiber reinforced composite material 18. The carbon fibers are thus effective for reinforcing the coupling. Of course, the filament-shaped fillers 19 serve to further increase the strength and rigidity of the ribs 20 to 22 and the coupling portions 14 and 15. To produce these effects, filament-shaped carbon fibers preferably have a fiber length equal to or larger than the thickness of a single layer of the fiber reinforced composite material 18 (for example, 2 mm or more) and equal to or less than 10 mm. A fiber length of 10 mm or less is preferable because this fiber length allows the fibers of the fillers 19 to be dispersed in the fiber reinforced composite material 18 by injection molding as smoothly and uniformly as possible Now, modifications of the present invention will be described. FIG. 6 is a sectional view of the rack housing 10 according to a first modification of the present invention as cut along a cutting plane extending along the axial direction X. In FIG. 6, members similar to the corresponding members described above are denoted by the same reference numerals, and the description of the members is omitted (this also applies to FIG. 7 and FIG. 8).

In the first modification, at least one of the above-described coupling portions 14 and 15 may be a separate component that is attached to the complete tubular portion 13 instead of being integrated with the tubular portion 13 as an injection molded product of the fillers 19 (filaments). FIG. 6 illustrates both the coupling portions 14 and 15 as separate components formed of metal such as aluminum die cast materials or the like. In this case, the rack housing 10 according to the first modification further includes a metallic ring 51 coupled to at least one of the two ends of the tubular portion 13 where the separate components are positioned. In FIG. 6, one metallic ring 51 is coupled to each of the two ends of the tubular portion 13. The above-described separate component (at least one of the coupling portions 14 and 15) is coupled to the metallic ring 51.

An outer peripheral surface 51A of the metallic ring 51 is subjected to surface roughing in advance. Thus, the outer peripheral surface 51A has a recessed and protruding portion 52 with a large number of recesses and protrusions. Examples of the surface roughing include knurling, keyway milling, splining, shot blasting, etching with acid, and laser etching. In view of machining costs, knurling is desirable. An internal thread portion 53 is formed on an inner peripheral surface 51B of the metallic ring 51.

In the manufacture of the rack housing 10 according to the first modification, when two laminating sheets 37 are set in the mold 38 on heating (see FIG. 5A), the metallic rings 51 are set in the mold 38. Specifically, the metallic ring 51 is externally fitted over an end (in FIG. 6, both ends) of the inner mold 39. Then, in a step of clamping the mold 38 and forming the tubular portion 13 by pressing as described above, the laminating sheet 37 forming the tubular portion 13 is wound around the outer peripheral surface 51A of the metallic ring 51. As a result, one metallic ring 51 is internally fitted into at least one end (in FIG. 6, both ends) of the tubular portion 13 to integrate the tubular portion 13 with the metallic ring 51. Then, the ribs 20 to 22 are formed as is the case with the above-described embodiment.

In FIG. 6, the coupling portion 14 includes a cylindrical insertion portion 14A inserted into the metallic ring 51. The coupling portion 15 includes a cylindrical insertion portion 15A inserted into the metallic ring 51. An external thread portion 54 is formed on an outer peripheral surface of each of the insertion portions 14A and 15A. The external thread portion 54 of the coupling portion 14 is thread-fastened (mechanically fastened) to an internal thread portion 53 of the right metallic ring 51 in FIG. 6. Thus, the coupling portion 14 is coupled to the metallic ring 51 and integrated with the tubular portion 13 via the metallic ring 51. The external thread portion 54 of the coupling portion 15 is thread-fastened to an internal thread portion 53 of the left metallic ring 51 in FIG. 6. Thus, the coupling portion 15 is coupled to the metallic ring 51 and integrated with the tubular portion 13 via the metallic ring 51. Consequently, the tubular portion 13, the coupling portion 14, and the coupling portion 15 are integrated with one another to complete the rack housing 10.

Preferably, a portion of each of the metallic rings 51 (for example, an approximately 2-mm portion of an end of the metallic ring 51 in the axial direction X) sticks out from an end of the tubular portion 13 in the axial direction X. Then, when the tubular portion 13 bends with respect to the coupling portions 14 and 15, the coupling portions 14 and 15 come into contact with the metallic ring 51, rather than the tubular portion 13. This prevents the tubular portion 13 from being broken as a result of the contact of the ends of the tubular portion 13 with the coupling portions 14 and 15.

In the rack housing 10 in the first modification, the tubular portion 13 is coupled, via the metallic ring 51, to the coupling portions 14 and 15, which are separate components. In the rack housing 10, when the tubular portion 13 is formed by pressing, the tubular portion 13 and the metallic ring 51 may be integrated together. Thus, the rack housing 10 can be manufactured in a short time. Since the laminating sheet 37 forming the tubular portion 13 is wound around the outer peripheral surface 51A of the metallic ring 51, this modification allows the carbon fibers 55 that are continuous in the laminating sheet 37 to be prevented from being cut compared to the case where a thread portion for fastening to the metallic ring 51 is machined on the inner peripheral surface of the tubular portion 13.

Figure 7:
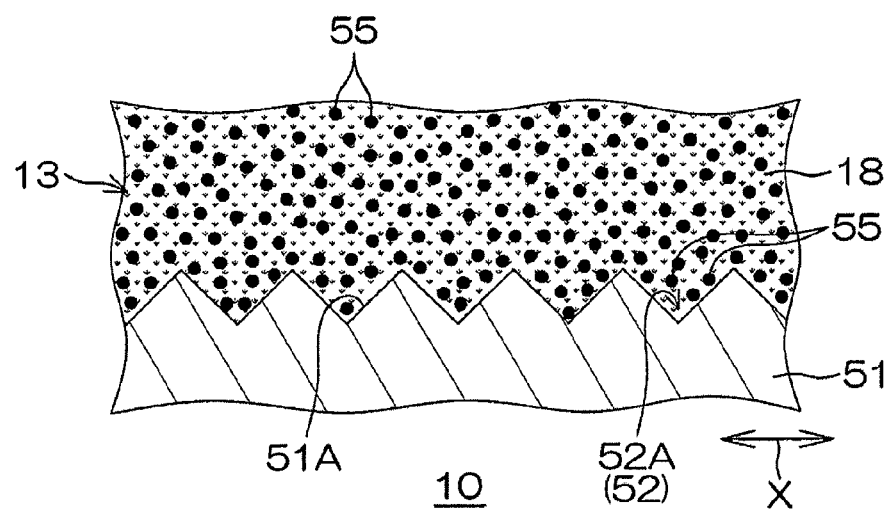
FIG. 7 is an enlarged view of a part of FIG. 6 enclosed by a long dashed short dashed line.

FIG. 7 is an enlarged view of a part of FIG. 6 enclosed by a long dashed short dashed line. As seen in FIG. 7, in the complete rack housing 10, the carbon fibers 55 in the inner peripheral surface of the tubular portion 13 preferably extend in the circumferential direction S. When the carbon fibers 55 extend in the circumferential direction S, pressuring in the above-described pressing causes the carbon fibers 55 and the thermoplastic resin in the inner peripheral surface of the tubular portion 13 to enter recess portions 52A of the recessed and protruding portion 52 of the outer peripheral surface 51A of the metallic ring 51. In this state, the thermoplastic resin oozing from the laminating sheet 37 in the inner peripheral surface of the tubular portion 13 is solidified into a shape along the recessed and protruding portion 52 of the outer peripheral surface 51A of the metallic ring 51, to function as a retainer (anchor). The carbon fibers 55 having entered the recess portions 52A of the outer peripheral surface 51A of the metallic ring 51 also function as a retainer. Thus, the anchor effect of the thermoplastic resin and the carbon fibers 55 in the inner peripheral surface of the tubular portion 13 allows the tubular portion 13 and the metallic ring 51 to be firmly connected together.

FIG. 8 is a diagram illustrating application of a second modification to FIG. 7. As seen in FIG. 8, on the outer peripheral surface 51A of the metallic ring 51 in the second modification, a thermobonding film 56 is provided along the recessed and protruding portion 52. The thermobonding film 56 may be attached to the outer peripheral surface 51 A of the metallic ring 51 before the metallic ring 51 is externally fitted over the end of the inner mold 39 of the mold 38. The thermobonding film 56 may be attached to the outer peripheral surface 51A of the metallic ring 51 after the metallic ring 51 is externally fitted over the inner mold 39. The interposition of the thermobonding film 56 allows the tubular portion 13 and the metallic ring 51 to be more firmly connected together.

The present invention is not limited to the above-described embodiment. Various changes may be made to the embodiment within the scope of the present invention, and the present invention is applicable to the manufacture of rack housings with various shapes and structures. For example, in the above-described embodiment (including the modifications), each of the coupling portions 14 and 15 is coupled to one of the two ends of the tubular portion 13. However, the coupling portion 14 or 15 may be coupled to at least one of the two ends of the tubular portion 13, and one of the coupling portions 14 and 15 may be omitted.

An example of the thermoplastic resin for injection molding is a thermoplastic resin compatible with the thermoplastic resin contained in the carbon fiber sheet 63; the thermoplastic resin for injection molding may be of a type that is the same as or different from that of the thermoplastic resin contained in the carbon fiber sheet 63. However, particularly preferably, the thermoplastic resin for injection molding is of the same type as that of the thermoplastic resin contained in the carbon fiber sheet 63. The thermoplastic resin for injection molding is preferably selected to have a higher melt flow rate than the thermoplastic resin contained in the carbon fiber sheet 63.

When the thermoplastic resin with a high melt flow rate and high fluidity is used for injection molding, the thermoplastic resin and the fillers 19 may infiltrate appropriately between the layers of the fiber reinforced composite material 18 and through the fiber reinforced composite material 18, allowing delamination to be more appropriately prevented. In view of such an effect, the thermoplastic resin for injection molding preferably has a melt flow rate of 30 g/10 min or higher, particularly 50 g/10 min or higher. When the melt flow rate is lower than this range, it may be impossible to obtain the effect that allows the thermoplastic resin and the fillers 19 to infiltrate appropriately between the layers of the fiber reinforced composite material 18 and through the fiber reinforced composite material 18, preventing delamination. The present invention is also applicable to manufacture of tubular members other than the rack housing 10.

What is claimed is:

1. A method for manufacturing a rack housing, the method comprising:
   setting two laminating sheets on heating in an area of a mold corresponding to a three-dimensional shape of the rack housing with a tubular portion that covers a rack shaft, the area corresponding to the tubular portion, the laminating sheets each being formed by laminating a carbon fiber sheet and a film of a thermoplastic resin; and
   clamping the mold, impregnating the carbon fiber sheet with the thermoplastic resin of the film, pressing each of the two laminating sheets into a shape with a half tube corresponding to a half circumference of the tubular portion and connection portions at both ends of the half tube in a circumferential direction, and bonding two half tubes together at the connection portions thereof to form the tubular portion.

2. The method for manufacturing a rack housing according to claim 1, comprising injecting a thermoplastic resin into the tubular portion formed by the pressing to form the thermoplastic resin into ribs covering the bonded connection portions.

3. The method for manufacturing a rack housing according to claim 2, wherein
   the rack housing includes a coupling portion coupled to at least one of two ends of the tubular portion in an axial direction of the tubular portion,
   the method includes setting a collar through which a separate component is inserted, in an area of the mold corresponding to the coupling portion when the two laminating sheets are set in the mold on heating, and
   in injecting the thermoplastic resin into the tubular portion, the thermoplastic resin is formed into the coupling portion with which the collar is integrated, and the tubular portion and the coupling portion are integrated together.

4. The method for manufacturing a rack housing according to claim 3, wherein the thermoplastic resin injected into the tubular portion includes fillers.

5. The method for manufacturing a rack housing according to claim 2, wherein
   the rack housing includes:
      a metallic ring coupled to at least one of two ends of the tubular portion; and
      a coupling portion coupled to the metallic ring,
   the method includes setting the metallic ring in the mold when the two laminating sheets are set in the mold on heating, and
   in forming the tubular portion by the pressing, the metallic ring is internally fitted into at least one of the two ends of the tubular portion to integrate the tubular portion with the metallic ring.

6. The method for manufacturing a rack housing according to claim 5, wherein the thermoplastic resin injected into the tubular portion includes fillers.

7. The method for manufacturing a rack housing according to claim 2, wherein the thermoplastic resin injected into the tubular portion includes fillers.

* * * * *